US008522296B2

(12) United States Patent
Kim et al.

(10) Patent No.: US 8,522,296 B2
(45) Date of Patent: Aug. 27, 2013

(54) BROADCAST RECEIVING APPARATUS AND METHOD FOR CONFIGURING THE SAME ACCORDING TO CONFIGURATION SETTING VALUES RECEIVED FROM OUTSIDE

(75) Inventors: Won-il Kim, Chungju-si (KR); Joon-hwan Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 808 days.

(21) Appl. No.: 11/948,056

(22) Filed: Nov. 30, 2007

(65) Prior Publication Data

US 2008/0313688 A1 Dec. 18, 2008

(30) Foreign Application Priority Data

Jun. 13, 2007 (KR) ........................ 10-2007-0057861

(51) Int. Cl.
*H04N 7/173* (2006.01)

(52) U.S. Cl.
USPC ............................ 725/110; 725/116; 725/117

(58) Field of Classification Search
None
See application file for complete search history.

(56) References Cited

U.S. PATENT DOCUMENTS

| | | | | |
|---|---|---|---|---|
| 6,407,779 | B1 * | 6/2002 | Herz | 348/734 |
| 6,981,045 | B1 * | 12/2005 | Brooks | 709/226 |
| 7,930,369 | B2 * | 4/2011 | Marriott et al. | 709/220 |
| 2001/0001160 | A1 * | 5/2001 | Shoff et al. | 725/51 |
| 2003/0007001 | A1 * | 1/2003 | Zimmerman | 345/716 |
| 2005/0036069 | A1 * | 2/2005 | Lee et al. | 348/632 |
| 2007/0053293 | A1 | 3/2007 | McDonald et al. | |
| 2007/0058033 | A1 * | 3/2007 | Tsai et al. | 348/14.05 |
| 2008/0313688 | A1 * | 12/2008 | Kim et al. | 725/110 |

FOREIGN PATENT DOCUMENTS

| | | | |
|---|---|---|---|
| KR | 10-2003-0030433 | A | 4/2003 |
| KR | 10-2004-0064989 | A | 7/2004 |
| WO | 02100092 | A1 | 12/2002 |

OTHER PUBLICATIONS

European Search Report issued Jul. 18, 2011 by the European Patent Office in Application No. 08102980.3.

* cited by examiner

*Primary Examiner* — Cai Chen
(74) *Attorney, Agent, or Firm* — Sughrue Mion, PLLC

(57) ABSTRACT

A broadcast receiving apparatus and a configuration method thereof are provided in which the broadcast receiving apparatus can be configured according to configuration setting values received from outside. The broadcast receiving apparatus is configured according to configuration setting values of the broadcast receiving apparatus, which are received from outside.

31 Claims, 6 Drawing Sheets

FIG. 3

| | | VIDEO CONFIGURATION | | | | | | | | | | | AUDIO CONFIGURATION | | ADDITIONAL FUNCTION CONFIGURATION | |
|---|---|---|---|---|---|---|---|---|---|---|---|---|---|---|---|---|
| | | GENERAL VIDEO CONFIGURATION | | | | | | | UNIQUE VIDEO CONFIGURATION | | | | GENERAL | UNIQUE | GENERAL | UNIQUE |
| | | BRIGHTNESS | SHARPNESS | GRAY LEVEL | COLOR DENSITY | WB | GAMMA | GREEN/RED COLOR | BACKGROUND COLOR | SCREEN RATIO | NOISE REMOVAL | QUALITY IMPROVEMENT | ... | ... | ... | ... |
| DRAMA | TYPE A | S1 | S2 | S3 | S4 | S5 | S6 | S7 | a1 | a2 | O | O | ... | ... | ... | ... |
| | TYPE B | | | | | | | | | b1 | X | | | ... | | ... |
| | TYPE C | | | | | | | | c1 | c2 | | | | ... | | ... |
| | TYPE D | | | | | | | | | | O | O | | ... | | ... |
| SPORTS | ... | | | ... | ... | ... | | | | ... | ... ... | | ... | ... | ... | ... |

BROADCAST RECEIVING APPARATUS AND METHOD FOR CONFIGURING THE SAME ACCORDING TO CONFIGURATION SETTING VALUES RECEIVED FROM OUTSIDE

CROSS-REFERENCE TO RELATED APPLICATIONS

This application claims priority from Korean Patent Application No. 10-2007-0057861, filed on Jun. 13, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to configuring a broadcast receiving apparatus, and more particularly, to configuring a broadcast receiving apparatus, in which broadcast programs are received and provided to a user.

2. Description of the Related Art

Examples of broadcast receiving apparatuses include televisions (TVs), which can receive various types of broadcast programs from broadcasting stations. The recent development of broadcasting technologies and diversification in broadcasting services has led to various types of broadcast programs.

TVs are operated according to a configuration set at the time of manufacture, or a configuration modified by a user. In order that broadcast programs are displayed in a more lifelike and realistic manner, TVs need to be configured suitably for the broadcast programs.

However, users may not know the operating configurations of TVs which are suitable for the broadcast programs, so may be unable to configure TVs suitably for the broadcast programs.

Even when a user knows the operating configuration of a TV which is suitable for the broadcast programs, he or she may become annoyed when trying to configure the TV according to the broadcast programs.

Additionally, operating configurations of TVs may differ for each broadcast program, so every time a user changes channels, or every time broadcast programs change without changing channels, the user may need to change the operating configuration of the TV, which causes inconvenience to the user.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a broadcast receiving apparatus and a configuration method thereof, in which the broadcast receiving apparatus can be configured according to configuration setting values received from outside.

According to an aspect of the present invention, there is provided a broadcast receiving apparatus comprising a function block which performs functions launched in the broadcast receiving apparatus; an interface which receives configuration setting values of the broadcast receiving apparatus from the outside; and a controller which controls the function block so that the function block is configured according to the configuration setting values received via the interface.

The interface may receive from an external device configuration setting values, which differ according to attributes of a broadcast program currently received by the broadcast receiving apparatus.

The external device may comprise at least one of an apparatus for providing a broadcast program and an apparatus for providing information regarding the broadcast program.

The interface may receive the configuration setting values of the broadcast receiving apparatus through a path and the broadcast program is received through another path which is different from the path through which the configuration setting values are received.

The other path may be at least one of a network, the Internet and a public switched telephone network (PSTN).

The broadcast receiving apparatus may further comprise a storage unit which stores the configuration setting values of the broadcast receiving apparatus received via the interface. The controller may control the function block so that the function block is configured according to the configuration setting values suitable for the currently received broadcast program among the configuration setting values stored in the storage unit.

The configuration setting values may comprise at least one of a configuration setting value of a broadcast screen displayed by a video output device, a configuration setting value of broadcast sound output through an audio output device and a configuration setting value of additional functions provided by the function block.

The configuration setting values may comprise at least one of general setting values for general functions of broadcast receiving apparatuses, and unique setting values for a specific function provided according to the type of the broadcast receiving apparatus.

According to another aspect of the present invention, there is provided a configuration method of a broadcast receiving apparatus, the method comprising receiving configuration setting values of the broadcast receiving apparatus from the outside; and configuring the broadcast receiving apparatus according to the received configuration setting values.

The receiving may comprise receiving from an external device configuration setting values, which differ according to attributes of a broadcast program currently received by the broadcast receiving apparatus.

The external device may comprise at least one of an apparatus for providing a broadcast program and an apparatus for providing information regarding the broadcast program.

The receiving may comprise receiving the configuration setting values of the broadcast receiving apparatus through a path and the broadcast program is received through another path which is different from the path through which the configuration setting values are received.

The other path may be at least one of a network, the Internet and a public switched telephone network (PSTN).

The configuration method may further comprise storing the received configuration setting values of the broadcast receiving apparatus. The configuring may comprise configuring the function block of the broadcast receiving apparatus according to the configuration setting values suitable for the currently received broadcast program among the stored configuration setting values.

The configuration setting values may comprise at least one of a configuration setting value of a broadcast screen displayed by a video output device, a configuration setting value of broadcast sound output through an audio output device and a configuration setting value of additional functions provided by the function block.

The configuration setting values may comprise at least one of general setting values for general functions of broadcast receiving apparatuses, and unique setting values for a specific function provided according to the type of the broadcast receiving apparatus.

According to another aspect of the present invention, there is provided a broadcast apparatus comprising an interface which is connected to a broadcast receiving apparatus for communication between the broadcast apparatus and the broadcast receiving apparatus; and a controller which transmits configuration setting values of the broadcast receiving apparatus to the broadcast receiving apparatus via the interface.

The controller may transmit configuration setting values corresponding to attributes of a broadcast program currently received by the broadcast receiving apparatus to the broadcast receiving apparatus via the interface.

The controller may transmit configuration setting values corresponding to the type of the broadcast receiving apparatus to the broadcast receiving apparatus via the interface.

According to another aspect of the present invention, there is provided a configuration control method comprising setting up a connection to a broadcast receiving apparatus enabling communication with the broadcast receiving apparatus; and transmitting configuration setting values of the broadcast receiving apparatus to the broadcast receiving apparatus.

The transmitting may comprise transmitting configuration setting values corresponding to attributes of a broadcast program currently received by the broadcast receiving apparatus to the broadcast receiving apparatus.

The transmitting may comprise transmitting configuration setting values corresponding to the type of the broadcast receiving apparatus to the broadcast receiving apparatus.

BRIEF DESCRIPTION OF THE DRAWINGS

The above and/or other aspects of the present invention will be more apparent by describing certain exemplary embodiments of the present invention with reference to the accompanying drawings, in which:

FIG. 3 is a table of configuration setting values, according to an exemplary embodiment of the present invention;

DETAILED DESCRIPTION OF EXEMPLARY EMBODIMENTS

Figure 1:
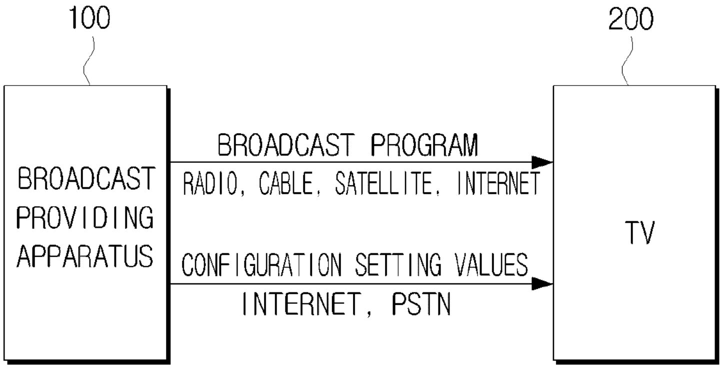
FIG. 1 is a diagram showing a broadcasting system to which the present invention is applicable.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1 is a diagram showing a broadcasting system to which the present invention is applicable. The broadcasting system of FIG. 1 is constructed by connecting a broadcast providing apparatus 100 to a television (TV) 200.

The broadcast providing apparatus 100 provides broadcast programs to the TV 200 by a wired or wireless connection, such as radio, a cable, a satellite or the Internet. Additionally, the broadcast providing apparatus 100 provides configuration setting values to the TV 200 via a network such as the Internet or a public switched telephone network (PSTN).

The TV 200 provides a user with the broadcast programs received from the broadcast providing apparatus 100. The TV 200 is configured according to the configuration setting values received from the broadcast providing apparatus 100.

The TV 200 may be configured according to configuration setting values input by a user through operation buttons included in the TV 200 or a remote controller (not shown), or may be configured according to configuration setting values received from the broadcast providing apparatus 100.

Figure 2:
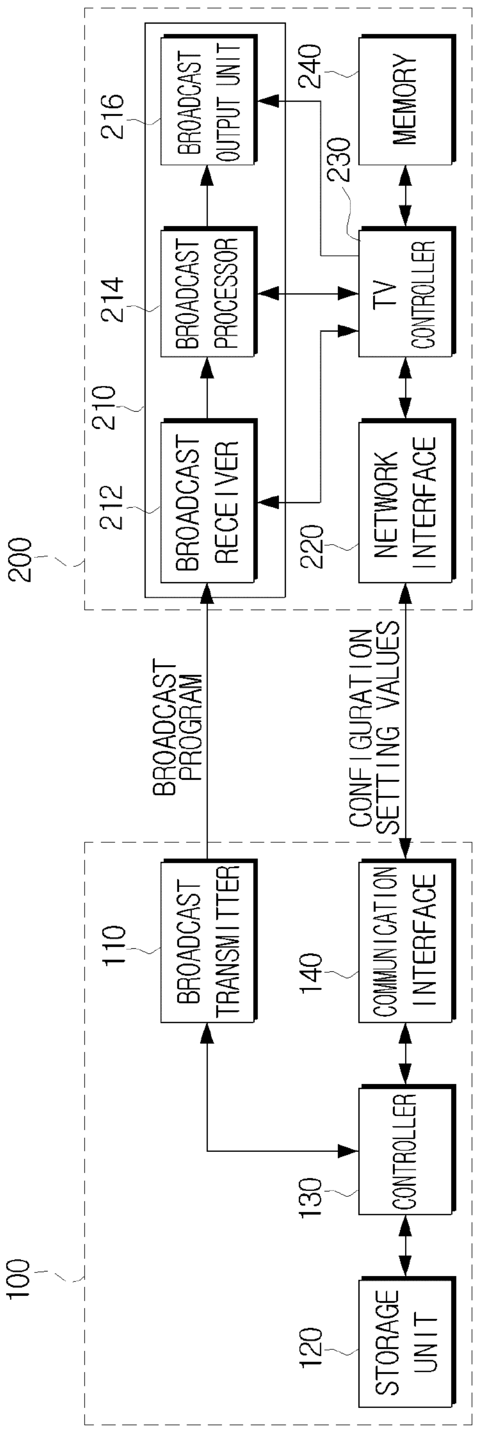
FIG. 2 is a detailed block diagram of a broadcast providing apparatus and a TV shown in FIG. 1, according to an exemplary embodiment of the present invention.

FIG. 2 is a detailed block diagram of the broadcast providing apparatus 100 and the TV 200 shown in FIG. 1.

In FIG. 2, the broadcast providing apparatus 100 according to an exemplary embodiment of the present invention comprises a broadcast transmitter 110, a storage unit 120, a controller 130 and a communication interface 140.

The broadcast transmitter 110 transmits the broadcast programs to the TV 200. The storage unit 120 is a storage medium in which the configuration setting values of the TV are stored. The configuration setting values may differ according to the genre of broadcast programs, and may differ according to the type of TVs even for the same genre. FIG. 3 schematizes the configuration setting values stored in the storage unit 120.

As shown in FIG. 3, the configuration setting values are divided into video setting values, audio setting values and additional function setting values.

The video setting values mean configuration setting values of a broadcast screen displayed by a video output device (for example, a liquid crystal display (LCD), a plasma display panel (PDP) or other devices) included in the TV. The video setting values comprise a brightness adjustment value, a sharpness adjustment value, a gray level adjustment value, a color density adjustment value, a white balance (WB) adjustment value, a gamma adjustment value, a green/red color adjustment value, a background color adjustment value (that is, for the background color displayed on a screen when broadcasting is not displayed on the TV), a screen ratio (16:9 or 4:3) adjustment value, a value indicating whether noise removal is performed and a value indicating whether the image quality improvement is performed.

The audio setting values mean configuration setting values of broadcast sound output through an audio output device (for example, a speaker or other devices) provided on the TV. The audio setting values comprise a left/right balance adjustment value, a value indicating whether stereo mode is set, an equalizer adjustment value, a value indicating whether a multi-sound mode is set, a value indicating whether a sound improvement function (for example, a sound retrieval system (SRS) or Dolby) is set, and a value indicating whether the audio output device is operated.

Additionally, the additional function setting values mean configuration setting values of the additional functions provided in the TV, and comprises a TV start-up setting value, a TV shutdown setting value, a power-suspend setting value, a menu transparency adjustment value, a value indicating whether an afterimage prevention mode is set.

The configuration setting values may be divided into general setting values for general functions of a TV, and unique setting values for specific functions provided only by a specific type of TV.

For example, the video setting values may be divided into general setting values, such as the brightness adjustment value, sharpness adjustment value, gray level adjustment value, color density adjustment value, WB adjustment value, gamma adjustment value and green/red adjustment value, and unique setting values, such as the background color adjustment value, screen ratio adjustment value, value indicating whether noise removal is performed and value indicating whether the image quality improvement is performed.

In other words, TVs generally have brightness adjustment, sharpness adjustment, gray level adjustment, color density adjustment, WB adjustment, gamma adjustment and green/red adjustment functions, but only certain TVs have background color adjustment, screen ratio adjustment, noise removal and image quality improvement functions.

Besides the video setting values, the audio setting values and the additional function setting values may also be divided into general setting values and unique setting values.

Referring back to FIG. 2, the communication interface 140 is connected to the network, enabling communication with the TV 200. The controller 130 transmits the configuration setting values stored in the storage unit 120 to the TV 200 through the communication interface 140.

When transmitting the configuration setting values, the controller 130 takes into account the type of TV 200 used. Specifically, if there are configuration setting values corresponding to the type of TV 200 connected to the broadcast providing apparatus 100, the controller 130 may transmit to the TV 200 all the general setting values (comprising the general video, audio and additional function setting values) and the unique setting values (comprising the unique video, audio and additional function setting values).

For example, if the connected TV 200 is of type "B", the controller 130 may send to the TV 200 the general setting values together with the unique setting values for type "B" TVs.

Here, the general setting values comprise the general video, audio and additional function setting values. Referring to FIG. 3, the general video setting values comprise a brightness of S1, a sharpness of S2, a gray level of S3, a color density of S4, WB of S5, a gamma value of S6 and a green/red color of S7.

The unique setting values for a type "B" TV comprises unique video setting values, unique audio setting values and unique additional function setting values. In FIG. 3, the unique video setting values for a type "B" TVs comprise a background color of a1, a screen ratio of a2, a noise removal of 0, and an image quality improvement of 0.

On the other hand, if there are no configuration setting values corresponding to the type of TV 200 connected to the broadcast providing apparatus 100, the controller 130 may transmit only the general setting values to the TV 200.

For example, if the connected TV 200 is of type "G", there may be no configuration setting values corresponding to type "G" in the storage unit 120, and so the controller 130 may transmit only the general setting values to the TV 200.

Referring to FIG. 3, the general video setting values comprise a brightness of S1, a sharpness of S2, a gray level of S3, a color density of S4, WB of S5, a gamma value of S6 and a green/red color of S7.

The broadcast providing apparatus 100 and the configuration setting values transmitted from the broadcast providing apparatus 100 to the TV 200 are described in detail above. Hereinafter, the TV 200 will be described in detail.

As shown in FIG. 2, the TV 200 according to an exemplary embodiment of the present invention comprises a function block 210, a network interface 220, a TV controller 230 and a memory 240.

The function block 210 performs a broadcast program output function or other additional functions under the control of the TV controller 230. The function block 210 comprises a broadcast receiver 212, a broadcast processor 214 and a broadcast output unit 216.

The broadcast receiver 212 receives the broadcast program transmitted from the broadcast transmitter 110 of the broadcast providing apparatus 100, and demodulates the received program data.

The broadcast processor 214 performs video signal processing, such as video decoding, scaling, brightness adjusting, sharpness adjusting and gray level adjusting and the like, and audio signal processing, such as audio decoding, left/right balance adjusting, stereo mode setting, equalizer adjusting and the like, with respect to the broadcast programs output from the broadcast receiver 212.

The broadcast output unit 216 displays the broadcast screen output from the broadcast processor 214 on a video output device such as a display, and outputs the broadcast sound through an audio output device such as a speaker.

The network interface 220 is connected so as to be in communication with the broadcast providing apparatus 100. The TV controller 230 stores the configuration setting values received from the broadcast providing apparatus 100 via the network interface 220 on the memory 240.

The TV controller 230 controls the operation of the function block 210 (in more detail, the broadcast receiving operation of the broadcast receiver 212, the broadcast processing operation of the broadcast processor 214 and the broadcast output operation of the broadcast output unit 216).

In this situation, the TV controller 230 may control the operation of the function block 210 so that the function block 210 (in more detail, the broadcast receiving configuration of the broadcast receiver 212, the broadcast processing configuration of the broadcast processor 214 and the broadcast output configuration of the broadcast output unit 216) can be configured according to the configuration setting values stored in the memory 240.

Hereinafter, an operating process of the broadcast providing apparatus 100 will be described in detail with reference to FIGS. 2 and 4, according to an exemplary embodiment of the present invention.

Figure 4:
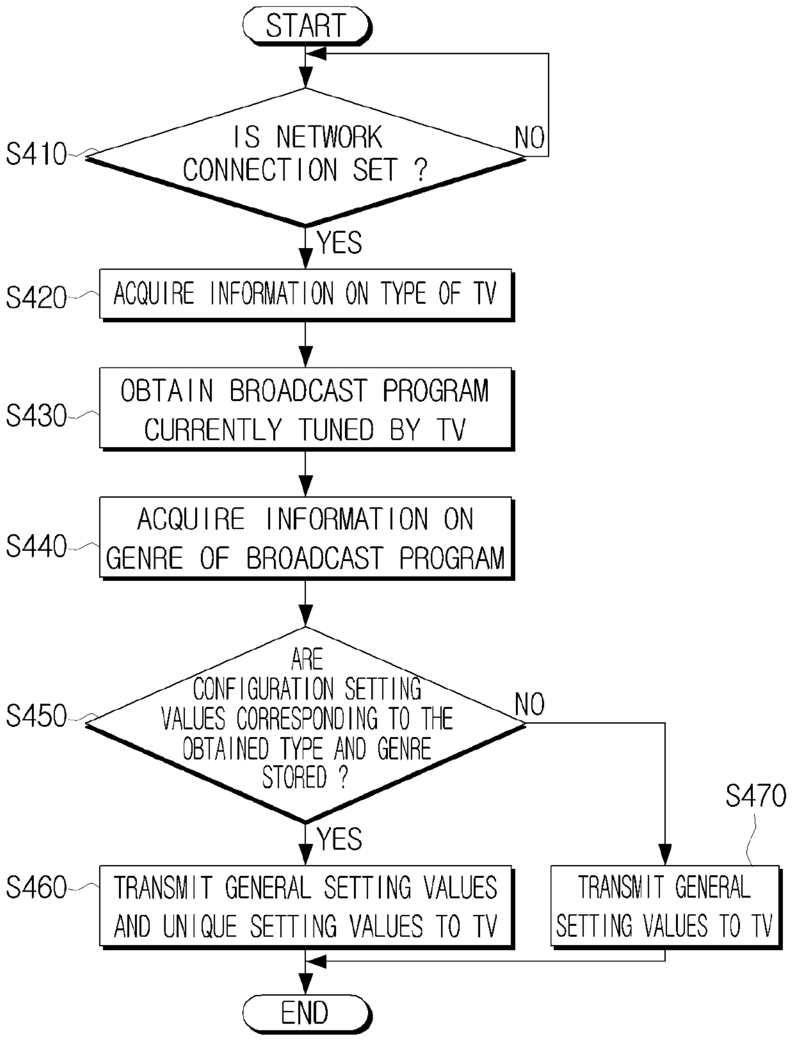
FIG. 4 is a flowchart explaining an operating process of the broadcast providing apparatus shown in FIG. 2, according to an exemplary embodiment of the present invention.

Referring to FIG. 4, if the TV controller 230 of the TV 200 is connected to the broadcast providing apparatus 100 on the network via the communication interface 140 and network interface 220 (S410—YES), the controller 130 of the broadcast providing apparatus 100 may acquire information regarding the type of the TV 200 (S420).

Specifically, during operation S420, the controller 130 may request the information regarding the type of the TV 200 from the TV controller 230, and a response to the request may be received.

The controller 130 may then obtain information regarding a broadcast program currently being tuned by the broadcast receiver 212 of the TV 200 (S430). Specifically, in operation S430, the controller 130 requests the information regarding the broadcast program currently being tuned by the broadcast receiver 212 from the TV controller 230, and a response to the request may be received.

Subsequently, the controller 130 may acquire information regarding the genre of the broadcast program obtained in operation S430 (S440). In order to acquire information regarding the genre of the broadcast program, the controller 130 may refer to the information regarding the broadcast program, because the information regarding the broadcast program contains information regarding the genre of the broadcast program.

The controller 130 determines whether the configuration setting values that correspond to the type of the TV 200 about which information was obtained at operation S420, and that are among the configuration setting values that correspond to the genre about which information was acquired at operation S440 are stored in the storage unit 120 (S450).

If it is determined that the corresponding setting values are stored in the storage unit 120 (S450—YES), the controller 130 may transmit both the general setting values and the unique setting values that correspond to the type of the TV 200 to the TV 200 through the communication interface 140 (S460).

For example, if the configuration setting values stored in the storage unit 120 are set as shown in FIG. 3 when the genre of the broadcast program currently being tuned by the TV 200 is "Drama" and the type of the TV 200 may be "A", "B", "C" or "D", operation S460 may be performed.

Alternatively, if it is determined that the corresponding setting values are not stored in the storage unit 120 (S450—NO), the controller 130 may transmit only the general setting values to the TV 200 through the communication interface 140 (S470).

For example, if the configuration setting values stored in the storage unit 120 are set as shown in FIG. 3 when the genre of the broadcast program currently being tuned by the TV 200 is "Drama" and the type of the TV 200 is not "A", "B", "C" or "D" (for example, if the TV is of type "G"), operation S470 may be performed.

Hereinafter, an operating process of the TV 200 will be described in detail with reference to FIGS. 2 and 5, according to an exemplary embodiment of the present invention.

Figure 5:
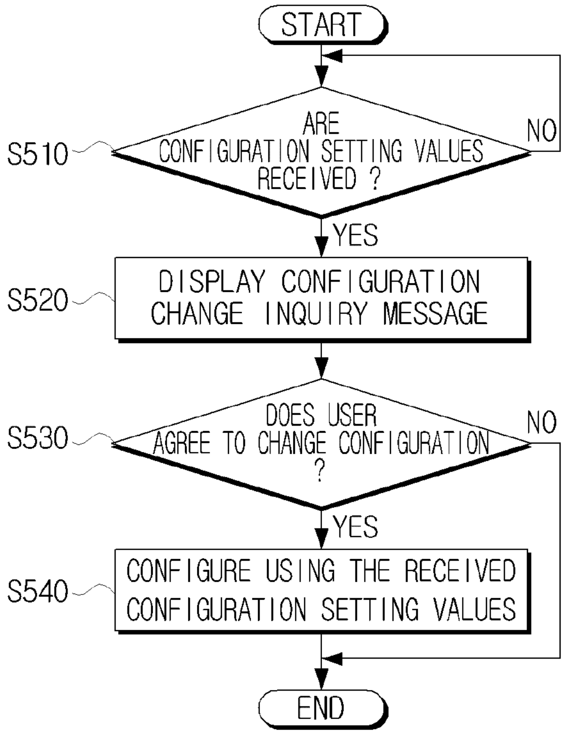
FIG. 5 is a flowchart explaining an operating process of the TV shown in FIG. 2, according to an exemplary embodiment of the present invention.

Referring to FIG. 5, if the configuration setting values are received from the broadcast providing apparatus 100 via the network interface 220 (S510—YES), the TV controller 230 may control so that a configuration change inquiry message is displayed on a screen of the TV 200 (S520). The TV controller 230 may then store the received configuration setting values on the memory 240.

In this situation, the configuration change inquiry message is provided in order to ask a user whether the user wishes to change the operating configuration of the TV 100 according to the configuration setting values received from the broadcast providing apparatus 100.

In order to display the inquiry message on a display (not shown) provided in the broadcast output unit 216, the TV controller 230 may control an on-screen-display (OSD) generating device provided in the broadcast processor 214, so that the inquiry message can appear on the broadcast screen output from the broadcast processor 214 to the broadcast output unit 216.

If the user agrees to change the operating configuration (S530—YES), the TV controller 230 may control so that the function block 210 (comprising the broadcast receiving configuration of the broadcast receiver 212, the broadcast processing configuration of the broadcast processor 214 and the broadcast output configuration of the broadcast output unit 216) can be configured according to the configuration setting values stored on the memory 240 (S540).

In operation S530, the user may decide whether the user agrees to change the operating configuration using a graphical user interface (GUI) together with the inquiry message displayed at operation S520.

If the user disagrees to change the operating configuration (S530—NO), operation S540 may not be performed. In other words, the operating configuration of the function block 210 may not be changed according to the configuration setting values received in operation S510.

The process by which the TV 200 is configured according to the configuration setting values received from the broadcast providing apparatus 100 to the TV 200 was described above in detail according to the exemplary embodiment of the present invention.

Although the configuration setting values comprise all of the video, audio and additional function setting values according to an exemplary embodiment of the present invention, the present invention is not limited thereto. Accordingly, the present invention may be applied even when the configuration setting values comprise only some of the video, audio and additional function setting values. In other words, the configuration setting values may comprise only the video setting values, or may comprise only the video and audio setting values.

Additionally, the configuration setting values are divided into general setting values and unique setting values in the exemplary embodiment of the present invention in order to facilitate understanding of the present invention. However, the configuration setting values may comprise only the general setting values or only the unique setting values. For example, the configuration setting values may comprise only the general setting values.

Moreover, the setting items used to set video, audio and additional function setting values are individually described in the exemplary embodiment of the present invention in order to facilitate understanding of the present invention. However, the present invention may be applied to a situation in which there is only a portion of the setting items or in which items other than the setting items are added.

Furthermore, according to the exemplary embodiment of the present invention, the TV determines whether the user agrees to change the operating configuration before the TV changes its operating configuration according to the configuration setting values received from the broadcast providing apparatus, but it is possible to set the TV in advance so that the operating configuration of the TV can be automatically changed at the same time as the configuration setting values are received without requiring the user's explicit consent.

In addition, while the configuration setting values are distinguished for each genre of broadcast programs in the exemplary embodiment of the present invention, the present invention is not limited thereto. Therefore, configuration setting values corresponding to each broadcast program may exist, and may be distinguished according to other attributes besides the genre of broadcast programs.

Attributes other than the genre of broadcast programs may comprise a screen ratio, a broadcast language and a broadcast country of the broadcast programs, but are not limited thereto.

For example, the screen ratio adjustment value of the TV may be set according to the screen ratio of the broadcast programs, and the broadcast language of the TV may be set according to the broadcast language of the broadcast programs. Additionally, in the case of the broadcast country of the broadcast program, the WB adjustment value may be set according to the country in which the program is being broadcast on the TV, not the country which produces the program.

Furthermore, the TV according to the exemplary embodiment of the present invention may be an analog TV, rather than a digital TV or an Internet TV. The present invention may be applied to any broadcast receiving apparatus capable of receiving broadcasting in place of the TV, for example, a set-top box (STB), a digital multimedia broadcast receiver, a digital audio broadcast (DAB) receiver, a portable device having broadcast receiving functions (for example, a mobile phone, a personal multimedia player (PMP), a navigator or other portable devices), or other devices.

While the broadcast providing apparatus capable of providing broadcast programs transmits the configuration setting values to the TV in the exemplary embodiment of the present invention, the present invention is not limited thereto. Accordingly, the present invention may be applied even when a broadcast information providing apparatus, which provides information regarding broadcasting instead of broadcasting, is used to provide the TV with the configuration setting values.

In addition, the present invention may also be applied to any broadcast apparatus capable of providing a TV with configuration setting values even when it is impossible to provide broadcasting and information regarding broadcasting.

Furthermore, the configuration setting values are transmitted from the broadcast providing apparatus to the TV via the Internet or the PSTN in the exemplary embodiment of the present invention, but may be transmitted through networks other than the Internet or the PSTN.

Moreover, although the broadcast programs are transmitted through a path, such as radio, a cable, a satellite or the Internet, and the configuration setting values are transmitted via a path, such as the Internet or a PSTN in accordance with the exemplary embodiment of the present invention, the broadcast programs and configuration setting values may be transmitted through the same path. For example, it is possible to send both the broadcast programs and configuration setting values via the Internet.

According to the exemplary embodiment of the present invention, the broadcast providing apparatus acquires information regarding the genre of the broadcast program currently being tuned by the TV and regarding the type of the TV, and sends the configuration setting values corresponding to the acquired information to the TV. However, the present invention is not limited to such a configuration.

For example, the broadcast providing apparatus may acquire the information regarding the type of the TV and may transmit configuration setting values corresponding to the acquired information, that is, configuration setting values of the entire genre corresponding to the type of the TV to the TV. The TV may then read the configuration setting values corresponding to the genre of the broadcast program currently being tuned by the TV from among the configuration setting values of the entire genre which are received from the broadcast providing apparatus and stored, and may be configured. In this situation, the TV may select configuration setting values in order to change its operating configuration instead of the broadcast providing apparatus.

Additionally, different configuration setting values may exist according to other attributes besides the genre of broadcast programs even in this situation. The TV may be configured according to configuration setting values suitable for the currently received broadcast program from among the stored configuration setting values.

Hereinafter, another exemplary embodiment of the present invention will be described in detail with reference to FIGS. 6 and 7.

Figure 6:
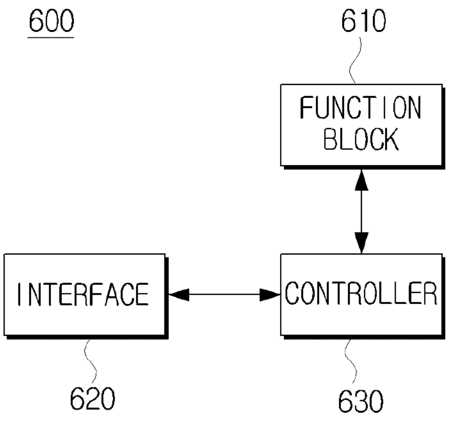
FIG. 6 is a block diagram of a broadcast receiving apparatus according to another exemplary embodiment of the present invention.

As shown in FIG. 6, a broadcast receiving apparatus 600 according to the other exemplary embodiment of the present invention comprises a function block 610, an interface 620 and a controller 630.

The function block 610 performs functions launched by the broadcast receiving apparatus 600. The interface 620 receives configuration setting values of the broadcast receiving apparatus 600 from the outside.

The controller 630 controls so that the function block 610 can be configured according to the configuration setting values received via the interface 620.

Figure 7:
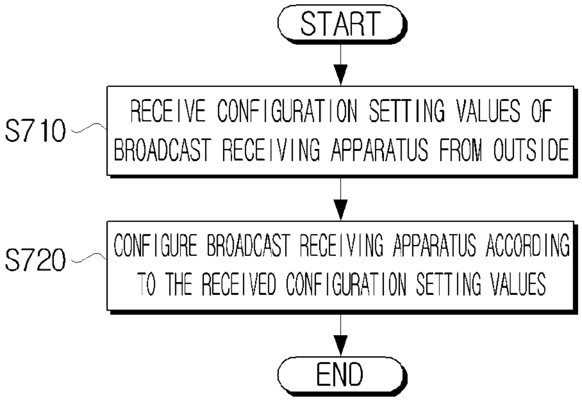
FIG. 7 is a flowchart explaining a configuration method of a broadcast receiving apparatus according to another exemplary embodiment of the present invention.

According to a configuration process of the broadcast receiving apparatus in FIG. 7, the broadcast receiving apparatus 600 receives the configuration setting values of the broadcast receiving apparatus from the outside (S710). The broadcast receiving apparatus 600 is then configured according to the received configuration setting values (S720).

Hereinafter, another exemplary embodiment of the present invention will be described in detail with reference to FIGS. 8 and 9.

Figure 8:
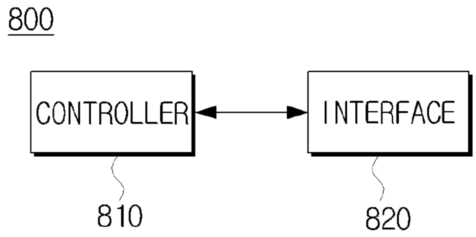
FIG. 8 is a block diagram of a broadcast apparatus according to another exemplary embodiment of the present invention.

As shown in FIG. 8, a broadcast apparatus 800 according to the other exemplary embodiment of the present invention comprises a controller 810 and an interface 820.

The interface 820 is connected such that the broadcast apparatus 800 can communicate with a broadcast receiving apparatus. The controller 810 transmits configuration setting values of the broadcast receiving apparatus to the broadcast receiving apparatus via the interface 820.

Figure 9:
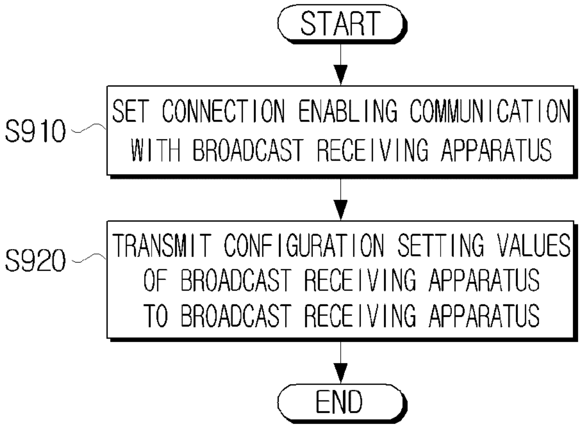
FIG. 9 is a flowchart explaining a configuration control process according to another exemplary embodiment of the present invention.

According to a configuration control process of the broadcast receiving apparatus in FIG. 9, the broadcast apparatus sets up a connection to the broadcast receiving apparatus so that the broadcast apparatus can communicate with the broadcast receiving apparatus. (S910). The broadcast apparatus then transmits the configuration setting values of the broadcast receiving apparatus to the broadcast receiving apparatus (S920).

As described above, the broadcast apparatus may also transmit the configuration setting values to the broadcast receiving apparatus, or the broadcast receiving apparatus may also be configured according to the received setting values.

According to the exemplary embodiments of the present invention as described above, the broadcast receiving apparatus may be configured according to the configuration setting values received from outside. Accordingly, there is no need for a user of the broadcast receiving apparatus to know the operating configuration of the broadcast receiving apparatus which is suitable for the broadcast program, nor to manually configure the broadcast receiving apparatus to match the operating configuration suitable for the broadcast program.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A broadcast receiving apparatus comprising:

a function block which performs a function launched in the broadcast receiving apparatus;

a first interface which receives a broadcast program from a broadcast providing apparatus;

a second interface which receives configuration setting values of the broadcast receiving apparatus from a broadcast configuration setting value providing apparatus in response to the launched function in the broadcast receiving apparatus, wherein the received configuration setting values are not input from a user of the broadcast receiving apparatus; and a controller which controls the function block so that the function block is configured according to the configuration setting values received via the second interface, wherein the configuration setting values comprise at least one from among a configuration setting value of a broadcast screen displayed by a video output device, a configuration setting value of broadcast sound output through an audio output device, and a configuration setting value of additional functions provided by the function block;, and wherein the configuration setting values provided by the broadcast configuration setting value providing apparatus depend on a program currently tuned by the broadcast receiving apparatus.

2. The apparatus as claimed in claim 1, wherein the second interface receives from an external device the configuration setting values, which differ according to attributes of a broadcast program currently tuned by the broadcast receiving apparatus.

3. The apparatus as claimed in claim 1, wherein the second interface receives the configuration setting values of the broadcast receiving apparatus through a path, and the first interface receives a broadcast program through another path which is different from the path through which the configuration setting values are received.

4. The apparatus as claimed in claim 3, wherein the path is at least one from among a network, the Internet and a public switched telephone network (PSTN).

5. The apparatus as claimed in claim 1, further comprising a storage unit which stores the configuration setting values of the broadcast receiving apparatus received via the second interface, wherein the controller controls the function block so that the function block is configured according to the configuration setting values suitable for a currently tuned broadcast program among the configuration setting values stored in the storage unit.

6. The apparatus as claimed in claim 1, wherein the configuration setting values comprise at least one from among general setting values for general functions of broadcast receiving apparatuses, and unique setting values for a specific function provided according to a type of the broadcast receiving apparatus.

7. A method of configuring a broadcast receiving apparatus, the method comprising:

receiving a broadcast program from a broadcast providing apparatus via a first interface;

receiving configuration setting values of the broadcast receiving apparatus from a broadcast configuration setting value providing apparatus in response to a launched function in the broadcast receiving apparatus via a second interface, wherein the received configuration setting values are not input from a user of the broadcast receiving apparatus; and configuring, by a controller of the broadcast receiving apparatus, the broadcast receiving apparatus according to the received configuration setting values, wherein the configuration setting values comprise at least one from among a configuration setting value of a broadcast screen displayed by a video output device, a configuration setting value of broadcast sound output through an audio output device and a configuration setting value of additional functions provided by the function block; and wherein the configuration setting values provided by the broadcast configuration setting value providing apparatus depend on a program currently tuned by the broadcast receiving apparatus.

8. The method as claimed in claim 7, wherein the receiving comprises receiving from an external device the configuration setting values, which differ according to attributes of a broadcast program currently tuned by the broadcast receiving apparatus.

9. The method as claimed in claim 8, further comprising transmitting from the broadcast receiving apparatus to the external device, in response to a request from the external device, at least one from among information regarding a type of the broadcast receiving apparatus and information regarding the broadcast program currently tuned by the broadcast receiving apparatus, wherein the information is used in determining the configuration setting values of the broadcast receiving apparatus.

10. The method as claimed in claim 7, wherein the receiving comprises receiving the configuration setting values of the broadcast receiving apparatus through a path, and the broadcast program is received through another path which is different from the path through which the configuration setting values are received.

11. The method as claimed in claim 10, wherein the path is at least one from among a network, the Internet and a public switched telephone network (PSTN).

12. The method as claimed in claim 7, further comprising storing the received configuration setting values of the broadcast receiving apparatus, wherein the configuring comprises configuring a function block of the broadcast receiving apparatus according to the configuration setting values suitable for a currently tuned broadcast program among the stored configuration setting values.

13. The method as claimed in claim 7, wherein the configuration setting values comprise at least one from among general setting values for general functions of broadcast receiving apparatuses, and unique setting values for a specific function provided according to a type of the broadcast receiving apparatus.

14. A broadcast configuration setting value providing apparatus comprising:

an interface which is connected to a broadcast receiving apparatus for communication via a network between the broadcast configuration setting value providing apparatus and the broadcast receiving apparatus, where the broadcast configuration setting value providing apparatus is remote from the broadcast receiving apparatus; and a controller which transmits from the broadcast configuration setting value providing apparatus configuration setting values of the broadcast receiving apparatus to the broadcast receiving apparatus via the interface, wherein the received configuration setting values are not input from a user of the broadcast receiving apparatus, wherein the configuration setting values comprise at least one from among a configuration setting value of a broadcast screen displayed by a video output device, a configuration setting value of broadcast sound output through an audio output device and a configuration setting value of additional functions provided by the function block, wherein the configuration setting values depend on a program currently tuned by the broadcast receiving apparatus, and wherein the program is provided from a broadcast providing apparatus to the broadcast receiving apparatus.

15. The apparatus as claimed in claim 14, wherein the controller transmits the configuration setting values corresponding to attributes of a broadcast program Currently tuned by the broadcast receiving apparatus to the broadcast receiving apparatus via the interface.

16. The apparatus as claimed in claim 14, wherein the controller transmits configuration setting values corresponding to a type of the broadcast receiving apparatus to the broadcast receiving apparatus via the interface.

17. The apparatus as claimed in claim 14, wherein prior to the receiving, the controller requests and receives from the broadcast receiving apparatus at least one from among information regarding a type of the broadcast receiving apparatus and information regarding a broadcast program currently tuned by the broadcast receiving apparatus, and determines the configuration setting values of the broadcast receiving apparatus.

18. A configuration control method comprising:

setting up a connection between a broadcast configuration setting value providing apparatus to a broadcast receiving apparatus enabling communication with the broadcast receiving apparatus, where the broadcast configuration setting value providing apparatus is remote from the broadcast receiving apparatus, which are connected via a network; and transmitting, by a controller of the broadcast configuration setting value providing apparatus configuration setting values of the broadcast receiving apparatus to the broadcast receiving apparatus, wherein the received configuration setting values are not input from a user of the broadcast receiving apparatus, wherein the configuration setting values comprise at least one from among a configuration setting value of a broadcast screen displayed by a video output device, a configuration setting value of broadcast sound output through an audio output device and a configuration setting value of additional functions provided by the function block, wherein the configuration setting values depend on a program currently tuned by the broadcast receiving apparatus, and wherein the program is provided from a broadcast providing apparatus to the broadcast receiving apparatus.

19. The method as claimed in claim 18, wherein the transmitting comprises transmitting the configuration setting values corresponding to attributes of a broadcast program currently tuned by the broadcast receiving apparatus to the broadcast receiving apparatus.

20. The method as claimed in claim 18, wherein the transmitting comprises transmitting the configuration setting values corresponding to a type of the broadcast receiving apparatus to the broadcast receiving apparatus.

21. The method as claimed in claim 18, further comprising requesting and receiving from the broadcast receiving apparatus at least one of information regarding a type of the broadcast receiving apparatus and information regarding the broadcast program currently tuned by the broadcast receiving apparatus, wherein the received information is used in determining the configuration setting values of the broadcast receiving apparatus.

22. The broadcast receiving apparatus of claim 1, wherein the configuration setting values comprise: brightness adjustment, sharpness adjustment, gray level adjustment, color density adjustment, WB adjustment, gamma adjustment and green/red adjustment functions.

23. The method as claimed in claim 7, further comprising determining the configuration setting values to transmit to the broadcast receiving apparatus based on a type of the broadcast receiving apparatus.

24. The method as claimed in claim 23, wherein the configuration setting values are stored in a table in the broadcast providing apparatus based on types of broadcast receiving apparatus.

25. The method as claimed in claim 24, wherein when the type of the broadcast receiving apparatus is not found in the table, providing default setting values for general functions of broadcast receiving apparatuses and wherein when the type of the broadcast receiving apparatus is found in the table, providing unique setting values for specific function of the broadcasting receiving apparatus and at least one of the default setting values for general functions of the broadcast receiving apparatuses.

26. The method as claimed in claim 7, wherein the configuration setting values are transmitted to the broadcast receiving apparatus from the broadcast providing apparatus in response to the broadcast receiving apparatus transmitting channel number or information of the currently broadcast program and type of the broadcast receiving apparatus.

27. The apparatus as claimed in claim 14, wherein the configuration setting values related to a function of configuring the broadcast receiving apparatus for playing the currently broadcast program are determined and transmitted by the broadcast apparatus to the broadcast receiving apparatus in response to receiving attributes of the currently broadcast program from the broadcast receiving apparatus.

28. The method as claimed in claim 18, further comprising:

receiving a program by the broadcast receiving apparatus;

receiving by the broadcast providing apparatus from the broadcast receiving apparatus attributes of the broadcast program;

determining and transmitting by the broadcast providing apparatus to the broadcast receiving apparatus the configuration setting values related to a function of configuring the broadcast receiving apparatus for playing the broadcast program, wherein the broadcast providing apparatus is not a user remote control.

29. The apparatus as claimed in claim 1, wherein the function block which performs the function is providing received broadcast, wherein the broadcast providing apparatus determines genre of the program currently tuned by the broadcast receiving apparatus, and wherein based on the determined genre, the broadcast providing apparatus determines which configuration setting values to provide to the broadcast receiving apparatus.

30. The apparatus as claimed in claim 1, wherein the configuration setting values comprise at least one of a TV start-up setting value, a TV shutdown setting value, a power-suspend setting value, a menu transparency adjustment value, and a value indicating whether an afterimage prevention mode is set.

31. The apparatus as claimed in claim 1, wherein the configuration setting values comprise at least one of a screen ration adjustment value and background color adjustment value.

* * * * *